Oct. 20, 1931.  H. HUEBER  1,828,713

DUAL WIPER WINDSHIELD CLEANER

Filed March 11, 1929

Inventor
Henry Hueber
by Barton A. Bean Jr.
Attorney

Patented Oct. 20, 1931

1,828,713

UNITED STATES PATENT OFFICE

HENRY HUEBER, OF BUFFALO, NEW YORK, ASSIGNOR TO TRICO PRODUCTS CORPORATION, OF BUFFALO, NEW YORK

DUAL WIPER WINDSHIELD CLEANER

Application filed March 11, 1929. Serial No. 346,096.

This invention relates to windshield cleaners and more particularly to a dual wiper type of cleaner.

Heretofore, the dual, oscillatory windshield cleaner has been a rather crude makeshift, rendered so by the manner of coupling the auxiliary wiper to the main wiper. In such prior constructions the auxiliary or secondary cleaner is mounted in a separate bracket secured at a spaced point on a windshield, and a power transmission link or coupler is then connected to both the auxiliary wiper arm and the main wiper arm at points below their pivotal centers. As the wipers swing in coupled relation, the transmission link is caused to swing up and down in front of the windshield, and directly across the line of vision of the driver of the automobile thereby tending to obscure his vision as well as constituting a source of annoyance to him. Furthermore, the transmission link is exposed and detracts from the neat appearance of the automobile.

The present invention aims to provide a windshield cleaner having the advantages of the dual oscillatory wipers but embodying the dual wipers in a unitary mount with the windshield cleaner motor or actuator whereby the entire assembly may be mounted as a unit on the windshield.

The invention further has for an object to house the transmission means between the two wipers so as to conceal it from view as well as to protect the mechanism from exposure. The invention also involves the disposition of the transmission mechanism or parts out of the field of vision, and further to arrange and support the cleaner motor intermediate the wipers and in a manner whereby the entire assembly may have compactness and lightness in its unitary makeup.

The invention also resides in the structural features hereinafter described and claimed, reference being had to the accompanying drawings wherein, Fig. 1 is a front elevation of a windshield equipped with a cleaner unit constructed in accordance with the present invention.

Figure 1:
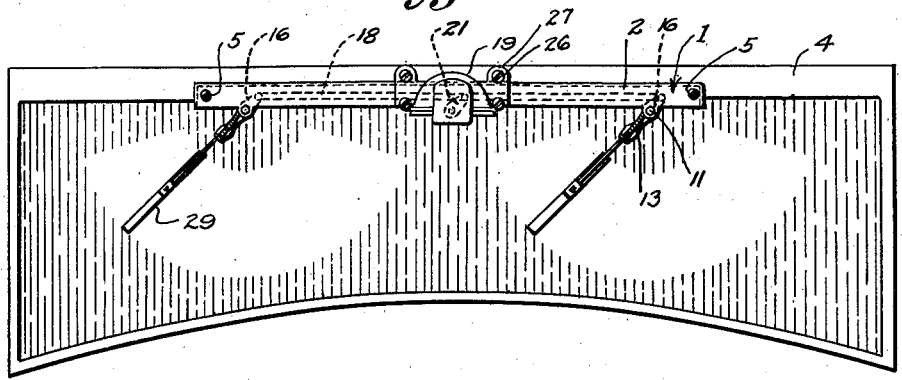
Figure 2:
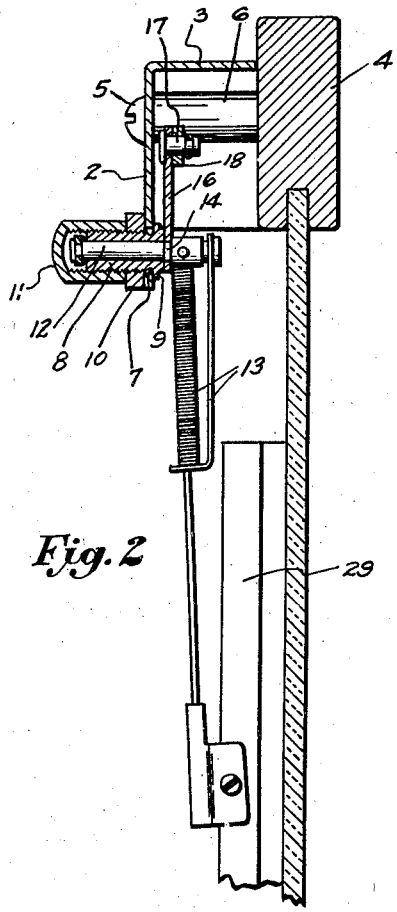
Fig. 2 is a section therethrough on the transverse plane of one of the wiper arm mountings.
Figure 3:
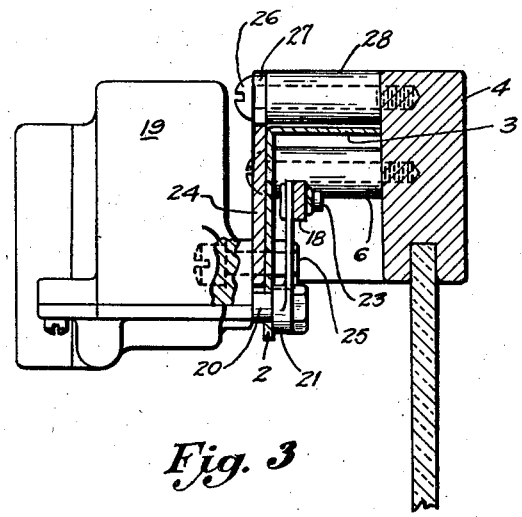
Fig. 3 is a transverse section more clearly depicting the mounting of the motor.
Figure 4:
Fig. 4 is a detail fragmentary showing of one of the crank arms carried by the wiper arm pivots.

In proceeding in accordance with the present invention, the numeral 1 designates the unit housing or casing which is preferably struck up from sheet metal to form the front wall 2 and the top wall 3, the casing being open at its bottom and closed at its rear side by the header bar 4 of the windshield to which the housing is attached. The housing may have its ends closed and is suitably secured to the header bar by spaced fastening screws 5 which are passed through sustaining spacing sleeves 6 provided within the housing to support the latter against collapse or crushing when the screws are tightened. Adjacent each end of the front wall 2 is provided an aperture 7 through which is passed from the rear a bearing sleeve 8 having a base flange 9 abutting the inner face of the front wall 2 and having its protruding outer end exteriorly threaded to receive the clamping nut 10. A grease-retaining cap 11 is then threaded over the exposed outer end of the bearing sleeve and serves to exclude dust and other foreign matter from entering the bearing of the sleeve.

A stud shaft 12 is journalled in sleeve 8 against accidental displacement and has its projecting end portion, within the housing 1, transversely apertured and peripherally grooved to receive the spring arm mounting 13 more clearly set forth in Patent No. 1,674,657 granted to John R. Oishei on June 26, 1928. The shaft carries a crank arm 16 which is keyed to it, as by forming a non-circular opening 15 in the arm and fitting it over a like-sectioned part 14 of the shaft. The crank arm extends upwardly into the housing 1 and is connected at its upper end by a suitable pivot 17 with a power-transmitting link or coupler 18 which joins the crank arm of one wiper shaft to the crank arm of the companion wiper shaft at the opposite end of the housing, the link being completely concealed within the housing and operating in a path out of the field of vision.

The windshield cleaner motor 19, herein depicted as being of the fluid pressure type, is also carried by the housing 1, being mounted on the exterior side of the front wall 2, and having its shaft 20 extending rearwardly through an opening in the front wall for supporting a power crank arm 21 at the rear side of said front wall. This crank arm is shown as also extending upwardly and is pivotally connected to the power-transmitting link 18 by suitable means, such as pivot 23.

By reason of the upwardly extending arms 16 and 21, the weight of the link 18 will tend to hold the wipers 29 against creeping down across the line of vision.

The housing may be constructed of very light sheet metal in order to relieve the windshield from unnecessary weight. Added support is therefore given the motor 19 by securing a heavier motor-supporting or anchoring plate 24 to the front wall 2, the motor-attaching bolts 25 serving as a means for securing the anchoring plate 24 to the front wall 2 so that the motor is connected to the housing for being mounted therewith as a unitary structure. In addition to the mounting screws 5 there is also provided other mounting screws 26 which pass through upwardly extending apertured ears 27 of the anchoring plate 24 and overlie the top wall 3 of said housing. These ears are braced from the header bar 4 by sustaining spacers 28 to avoid undue pressure being placed upon the adjacent portion of the sheet metal housing.

In attaching the windshield cleaner to a header bar it is only necessary to utilize the several screws 5 and 26 which secure the unitary structure in position. In this unitary structure the housing practically constitutes the sole means of support for the spaced oscillatory wipers and the windshield cleaner motor, and since the power transmission means are concealed within the housing a neat appearance is obtained without obscuring the driver's vision or restricting his field of vision.

The operation of the double capacity cleaner is believed to be obvious. As the motor 19 oscillates its crank arm 21, the bar or link 8 has imparted to it a reciprocatory motion which is translated by the crank arm 16 back into a reciprocatory motion for causing the wipers 29 to clean arcuate zones on the windshield.

What is claimed is:

1. A dual wiper windshield cleaner comprising a support having a front wall, an overhanging top wall and an open bottom to form a housing, said front wall having three spaced openings, a pair of shafts journalled in two of the openings and each having a crank arm extending upwardly beneath the overhanging top wall, wiper supporting arms carried by the said shafts and extending downwardly through said open bottom, a motor mounted on the support and having an operating shaft extending through the third opening of the front wall, a crank arm carried by the motor shaft and extending upwardly beneath said overhanging wall, and a rigid link extending alongside of said front wall and connecting the several crank arms.

2. A windshield cleaner comprising an elongated housing having a front wall and a top wall, and being open at its bottom, a pair of wiper-supporting members journalled in the front wall within the housing, a motor-supporting plate secured to the front wall and having an ear extending thereabove, means for attaching the housing including a member engaged with said ear and overlying the top wall, a motor carried by said plate, and power connections between the motor and said wiper-supporting members.

3. A dual wiper windshield cleaner comprising an elongated housing having a front wall, an overhanging top wall and an open bottom, said front wall having an opening adjacent each end and a centrally disposed opening; a sleeve secured in each of the two outer openings and extending outwardly relative to the housing from said front wall; a stub shaft pivotally mounted in said sleeve and extending therethrough and inwardly of said front wall; means on said stub shaft abutting each end of said sleeve to prevent lateral displacement of said stub shaft; a crank arm secured to said stub shaft adjacent the inner side of said front wall and projecting upwardly in said housing; a wiper supporting arm secured to said stub shaft within said housing and extending downwardly through the said open bottom; a motor centrally carried by said housing on the outside thereof and having a motor shaft extending through the central opening of said front wall and inwardly of said housing; a crank arm carried by the motor shaft within said housing and extending upwardly; and a link connecting the three cranks at their upper ends for synchronous movement.

4. A windshield cleaner comprising a hollow support having an open bottom, a plurality of wiper supporting arms pivotally connected to said support on the interior thereof, said arms extending downwardly through said open bottom of said support, a motor mounted on the support and having its shaft extending within said support, upwardly extending crank arms on the wiper supporting arms and motor shaft, a link connecting the crank arms for synchronous movement, and means for attaching the assembly as a unit to a windshield.

HENRY HUEBER.

CERTIFICATE OF CORRECTION.

Patent No. 1,828,713.  Granted October 20, 1931, to

HENRY HUEBER.

It is hereby certified that error appears in the printed specification of the above numbered patent requiring correction as follows: Page 2, line 79, claim 2, strike out the words "within the housing" and insert instead and extending downwardly through the said bottom; and that the said Letters Patent should be read with this correction therein that the same may conform to the record of the case in the Patent Office.

Signed and sealed this 15th day of December, A. D. 1931.

(Seal)

M. J. Moore,
Acting Commissioner of Patents.